United States Patent [19]
Appler et al.

[11] 3,796,496
[45] Mar. 12, 1974

[54] LASER PLUMMET LEVEL

[76] Inventors: Robert L. Appler, Sand Hill Rd., Elliott City, Md. 21043; Hubert H. Hoehn, 6906 Bradford Ct., Laurel, Md. 20810

[22] Filed: Aug. 3, 1971

[21] Appl. No.: 168,601

Related U.S. Application Data

[63] Continuation-in-part of Ser. No. 871,922, Oct. 28, 1969, Pat. No. 3,667,849.

[52] U.S. Cl. .............. 356/138, 331/94.5 A, 356/153
[51] Int. Cl. ......................... G01b 11/26, G01c 1/00
[58] Field of Search ........... 356/138, 153; 331/94.5, 331/94.5 A; 240/122

[56] References Cited
UNITED STATES PATENTS

| | | |
|---|---|---|
| 3,652,166 | 3/1972 | Bessko et al. ..................... 356/153 |
| 3,499,713 | 3/1970 | Ito ..................................... 356/138 |
| 3,544,165 | 12/1970 | Snedden ........................ 331/94.5 A |
| 3,588,249 | 6/1971 | Studebaker ................... 331/94.5 A |
| 3,395,608 | 8/1968 | Neill ............................. 331/94.5 A |

*Primary Examiner*—Ronald L. Wibert
*Attorney, Agent, or Firm*—Kenneth E. Prince

[57] ABSTRACT

There is provided herein a laser level surveying instrument including means for projecting a laser beam at a desired elevation and means for interrupting the flow of current to the plasma tube in response to undue physical disturbance of the instrument which might disturb the direction of the directed beam.

3 Claims, 5 Drawing Figures

INVENTORS
ROBERT L. APPLER
HUBERT H. HOEHN

ATTORNEY

INVENTORS
ROBERT L. APPLER
HUBERT H. HOEHN

ATTORNEY

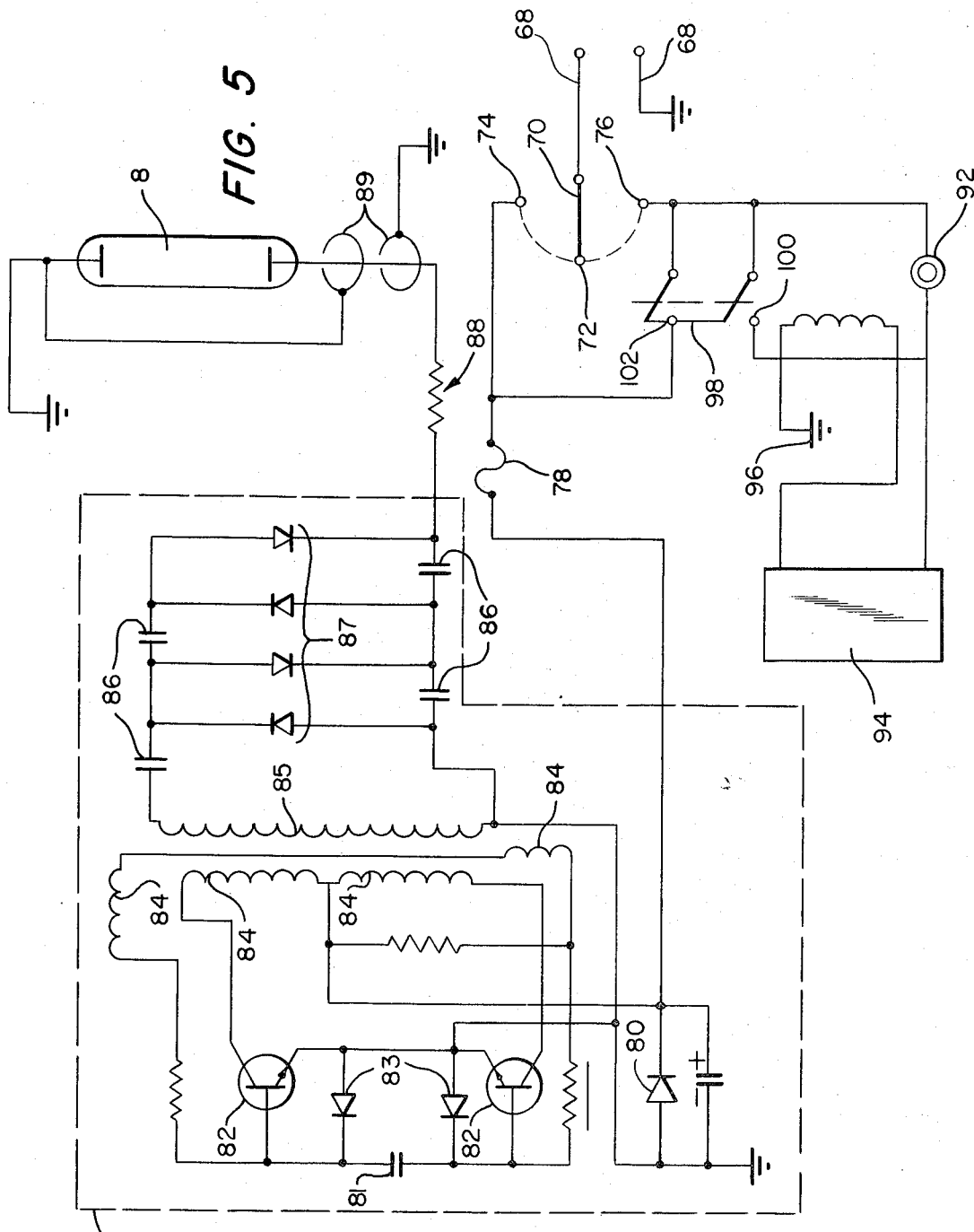

LASER PLUMMET LEVEL

This application is a continuation-in-part of our application Ser. No. 871,922, filed Oct. 28, 1969; now U. S. Pat. No. 3,667,849.

This invention relates to a surveying device which substitutes for the conventional telescope and visual sighting, a laser beam projected along a predetermined course, which may be intercepted at various distances from the source by an appropriate target. In one specific aspect, it relates to a surveying device which is particularly adapted for transmitting a laser beam along a predetermined course at a desired elevation. In another specific aspect, it relates to a surveying device suitable for elevation work or stadia surveying provided with a means for transmitting a vertical beam for use also as a plummet.

In our co-pending application Ser. No. 871,922 filed Oct. 28, 1969, we described a surveying device including a laser generating and transmitting unit and a second unit designated an azimuth transfer unit. This apparatus was defined as being particularly useful in certain types of surveying where it is desirable to determine an above-grade azimuth and transmit a corresponding below-grade azimuth at a predetermined elevation. However, there are many situations where a two-unit apparatus is not necessary as in surface grading or in the erection of tall buildings where maximum accuracy in verticality is essential.

For this purpose, we have provided a single-unit laser-plummet-level which is adapted to be mounted on a support and which projects a vertical beam, either upwardly or downwardly, and a generally horizontal azimuth beam which can be set at a predetermined elevation. With this instrument, it is possible to establish a position over a bench mark using the vertical beam to fix the horizontal component of the laser beam at a desired azimuth and desired elevation. Once the instrument is set, it does not require further attention. A position with respect to the unit can be determined at any time by intercepting the projected laser beam on a suitable target. This type of apparatus is particularly adapted to use in surface grading or in the laying of pipe in trenches where a predetermined fall is desired, as in the case of sewer pipes.

Since the laser beam source is adapted to be set in position and left unattended, it is necessary that means be provided to detect any unusual shock ot the instrument which might disturb the elevation or the azimuth and lead to incorrect readings. We have provided means for interrupting the flow of current to the laser generator in our instrument if the instrument is jarred or shaken sufficiently to alter the setting.

Our invention will be more fully explained by reference to the accompanying drawings in which:

FIG. 5 is a wiring of the shock-detection and power-interrupting device.

Figure 1:
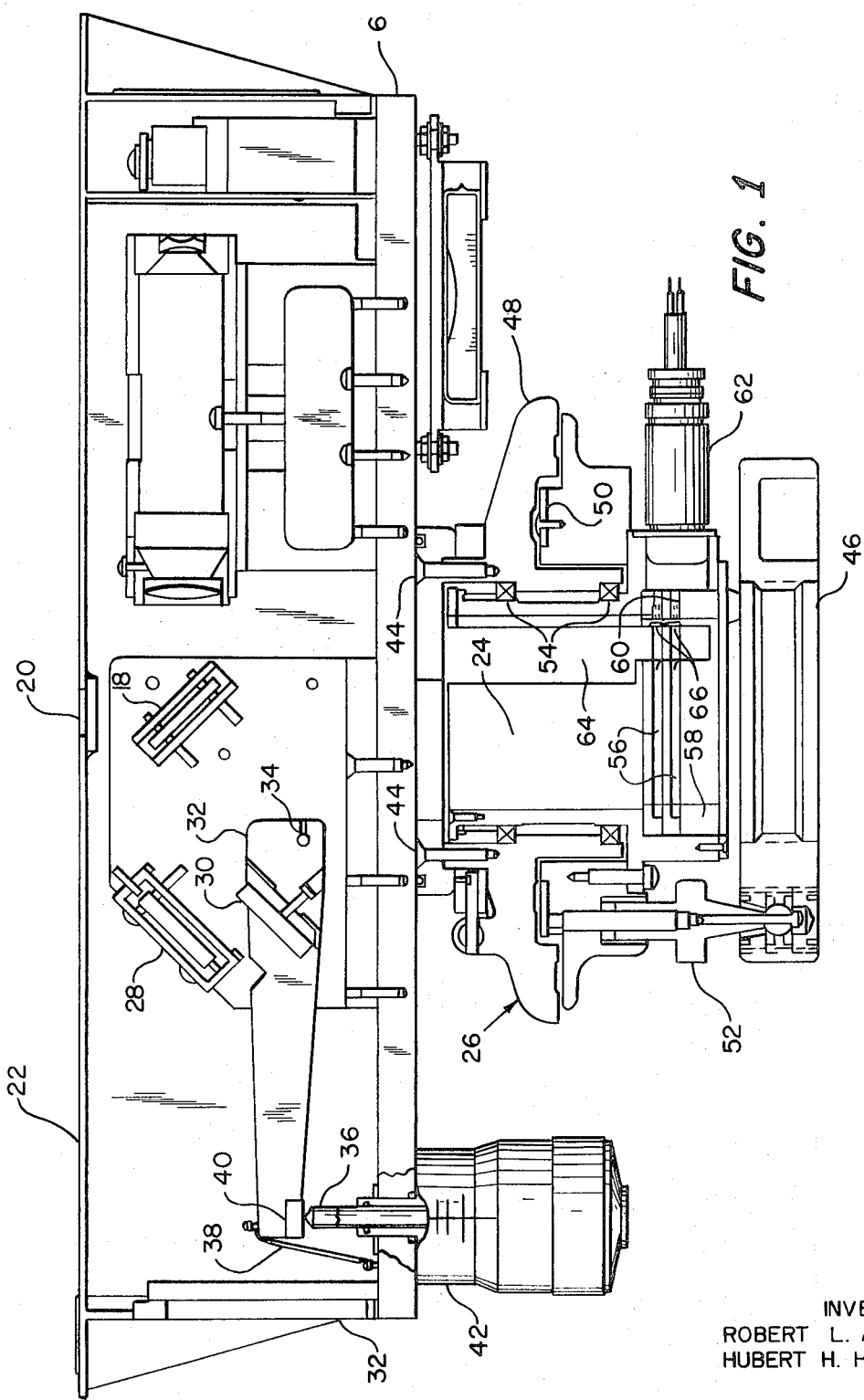
FIG. 1 is a cross-sectional view of the instrument showing the transmitting and reflecting means and the instrument carriage.
Figure 2:
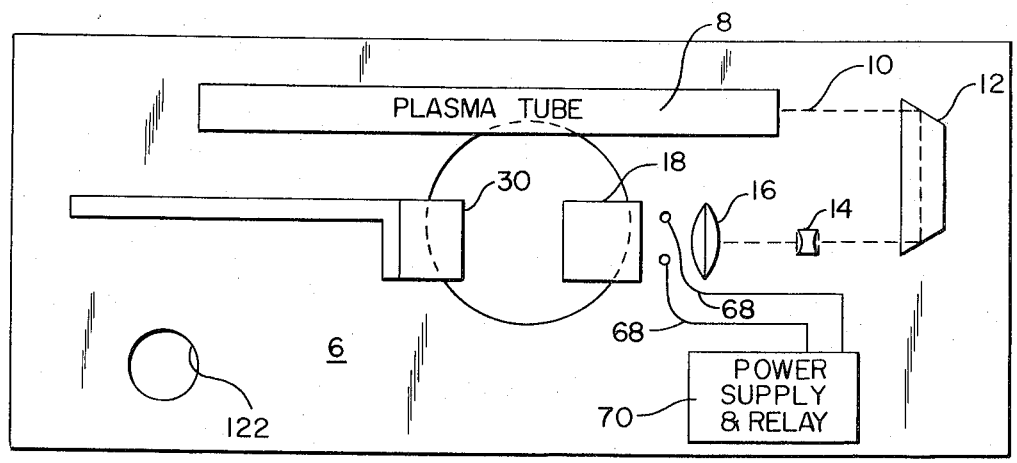
FIG. 2 is a plan view showing the arrangement of the essential parts of an instrument embodying the present invention.

Referring now to the drawings and particularly at first to FIGS. 1 and 2, the device of the present invention includes a base 6 on which is supported a laser generator such as plasma tube 8 (FIG. 2) which emits a laser beam 10 against a prism 12 which reverses the direction of the beam into telescopic lens 16. The plasma tube 8 and collimator 14 and telescopic lens 16 could be in line and the prism 12 eliminated. However, this would make the instrument considerably longer and more difficult to handle. For this reason, we prefer to use the prism 12 to reverse the direction of the laser beam and thereby make it possible to reduce the overall length of the apparatus. From lens 16, the beam passes to a beam-splitter 18 which is mounted for rotation about its horizontal axis and which reflects a beam normal to the direction of laser beam 10 and refracts another component in the same direction as the entering beam. Beam-splitter 18 is adapted to be rotated about its horizontal axis so that the vertical component can be projected either upwardly or downwardly while still passing a refracted component in the same direction as the original beam. The upward component is passed through an opening 20 (FIG. 1) in the protective cover 22 or downwardly through an opening in the bottom of support 6 and through passage way 24 in the middle of carriage 26 on which the instrument is mounted. The refracted portion of the beam strikes a fixed mirror 28 disposed at a 45° angle across its path and is reflected downwardly into a second mirror 30 positioned to reflect the beam along the same azimuth through opening 32.

Mirror 28 is mounted in a slot provided therefor in sine bar 31 which is pivoted about an axis 34 on its inner end and at its outer end, is biased against spindle 36 by means of spring 38. The contact between the outer end of sine bar 31 and spindle 36 is a hardened bearing block 40 which may be hard metal, crystal or other suitable material which will not be appreciably deformed or worn at the point of contact with spindle 36. Associated with spindle 36 is a micrometer-adjusting device 42 which is mounted on the underside of base 6 and which can be rotated to raise or lower spindle 36 and thereby raise or lower the elevation of the beam reflected from mirror 30.

The unit just described is securely bolted by appropriate means such as screws 44, to carriage 26 which includes a lower portion 46 adapted for attachment to a suitable tripod or other supporting device (not shown). Positioned on base 46 is a rotatable member 48 to which the laser generator transmitting unit is attached as at 44. This unit is provided with an azimuth scale 50 and leveling screws 52. The upper and lower parts are held in rotatable position but with minimum clearance by means of bearing rings 54.

Extending upwardly and fixed to base 46 is a sleeve 24 on which fits within bearing rings 54 for rotation within carriage 26. This sleeve provides the opening through which a downwardly directed beam from beam-splitter 18 passes. At the lower end of sleeve 24 are conducting rings 56 which are mounted in non-conducting material 58 but which is in contact with electrically conductive pins 60 to plug 62 which is in turn connected to a suitable source of power (12 volts DC) not shown. Projecting downwardly into sleeve 24 is an electrode support 64 which is fastened immovably to the underside of base 6 and which carries at its lower end a pair of contacts 66 which are biased against the conducting rings 56 by suitable means not shown but which will on rotation of the instrument maintain electrical contact therewith. Extending upwardly through support 64 from contacts 66 are suitable wires 68 (FIG. 2) which carry current from the power source to the power supply and relay 70 through suitable switching means which will be described hereafter.

Referring now specifically to FIG. 5, the current enters through paired lines 68, one of which is grounded, to switch 71 which can be set in "off" position at contact 72, "on" position at contact 74, or "fail-safe" position at contact 76. When the switch is in "on" positions, the current flows directly to the plasma tube 8 through fuse 78 and appropriate amplifying and transforming components (80–89) whereby it is converted from 12 volt current to the desired 2,000 volts and 18 watts necessary for the operation of plasma tube 8. This flow of current should be used only when the instrument is attended so that any shock or jarring which would disturb the instrument setting would be detected.

Figure 3:
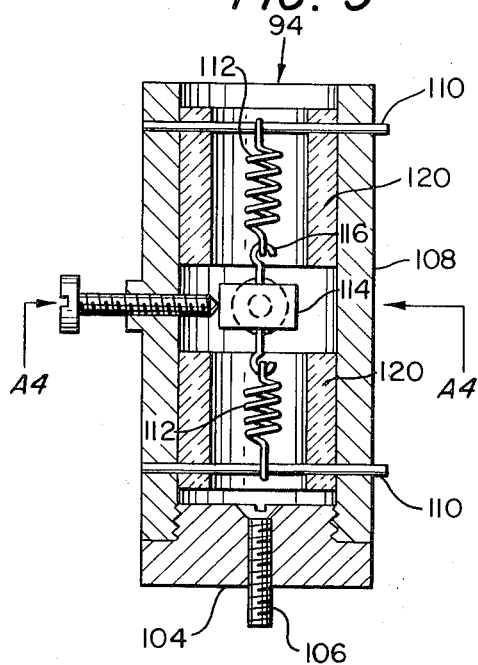
FIG. 3 is a cross-sectional view of the shock-detection device.
Figure 4:
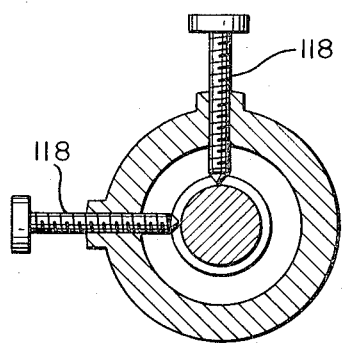
FIG. 4 is a cross-sectional view of FIG. 3 taken along lines 4—4.

When the instrument is to be set up and operated unattended, it is preferable to cause the current to flow through the "fail-safe" device which will, if the instrument is jarred or unnecessarily shaken, interrupt the flow of current to the tube and stop its operation until the instrument is re-set and the power flow reestablished. The "fail-safe" device operates by flow of current from contact 76 to re-set button 92 which allows the current to flow to the "fail-safe" device 94, which will be described in greater detail below. With the current flowing through "fail-safe" 94 to ground 96, relay 98 is caused to close so that current flows through terminal 100 to terminal 102 and thence to the amplifying system described above. If the instrument, having been put into operation using the "fail-safe" circuit, should be jarred sufficiently to disturb the setting, the current flow through "fail-safe" 94 is interrupted causing relay 102 to open and stop the flow of current to the plasma tube. In order for flow to the circuit to be reestablished, it is necessary to actuate the re-set device 92 physically, which gives the attendant an opportunity to examine the setting to determine that it is still in order. The "fail-safe" device 94 (FIGS. 3 and 4) consists of a base 104 which can be mounted on unit base 6 by means of appropriate screw 106. This base is of appropriate non-conducting material and is provided with an outer thread onto which is fitted a similarly non-conducting tube 108 through the walls of which pass pins 110, likewise of non-conducting material secured to which are a pair of springs 112 adapted to support a conducting disc 114, which may be attached to springs 112 by any appropriate means such as hooks 116. Conducting disc 114 is of diameter slightly less than the interior diameter of tube 108 and is suspended concentrically therein. Passing through the walls of tube 108 and extending radially inwardly to touch disc 114 are a pair of contacts 118 which are threaded to pass through a threaded hole in the wall of tube 108 so that contact with conducting disc 114 is maintained and by running the screws inwardly, disc 114 can be displaced slightly from true concentric and thereby be held more tightly against the contacts 118. In this position it will require a slightly greater jolt to interrupt the flow of current than if the contacts 118 are barely touching conducting disc 114. These members are preferably gold-plated so that there is a continuous flow of current even though the area of contact is exceedingly small. Extending inwardly from each end of tube 108 almost to the point of contact with the disc 114 are a pair of sleeves 120 of non-conducting material which are of such size that movement of conducting disc 114 is restricted and stretching of the springs beyond their elastic limits is avoided. current flowing through reset device 92 (FIG. 5) to one of contacts 118 (FIG. 3) passes during operation through disc 114 to the other contact 118 and thence through appropriate wiring hook-up to ground 96 (FIG. 5).

The power supply unit (FIG. 5) is provided to raise the 12 volts DC current to the 2,000 volts DC necessary for the operating plasma tube 8. For this purpose, we have provided a starting diode 80, capacitor 81, paired transistors 82 and paired diodes 83 for converting current to alternating current which can be passed through primary winding 84 and secondary winding 85 for elevation to the desired 2,000 volts. To start plasma tube 8 requires 8,000 volts, to obtain which we have provided suitably arranged capacitors 86, diodes 87 and resistor 88. The current flows through shielded cable 89 to plasma tube 8.

The entire unit is closed to the outside by means of cover 20. To maintain a desired low humidity inside the unit, we have provided a desiccator compartment (FIG. 2) which is filled with a suitable desiccant such as silica gel, molecular sieves or other dry, non-dusting adsorbent.

If desired, the micrometer unit 42 may be enclosed in a suitable protective cover with a projecting thumb screw so that it can be protected from the atmosphere.

We claim:

1. A laser-plummet-level instrument comprising in combination a movable support, a laser tube mounted thereon for emitting a laser beam, a power source operatively associated with said tube, a beam splitter intercepting said laser beam and transmitting a vertical component and a horizontal component, an inertia switch interposed between said laser tube and said power source adapted to interrupt the flow of current in response to undesirable jarring of said instrument and manual means for restoring the flow of current to said laser tube.

2. The instrument defined in claim 1 having means for raising and lowering the angle at which said horizontal component is transmitted without moving said instrument.

3. The invention of claim 1 wherein said inertia switch comprises a non-conductive body mounted on the support and having a cavity therein, a floating conductive member movably suspended within said cavity having a home position under quiet conditions, a pair of conductive members separately extending through the wall of said non-conductive body and being in contact on their interior ends with said floating member, and being connected in sequence between said power source and said laser tube whereby movement of said floating member horizontally interrupts the flow of current from said power source to said laser tube.

* * * * *